Feb. 19, 1963 M. C. BURK 3,077,770
RUBBER BALE MOISTURE ANALYZER
Filed Feb. 15, 1960 5 Sheets-Sheet 1

INVENTOR.
M.C. BURK
BY Hudson & Young
ATTORNEYS

Feb. 19, 1963   M. C. BURK   3,077,770
RUBBER BALE MOISTURE ANALYZER
Filed Feb. 15, 1960   5 Sheets-Sheet 2

INVENTOR.
M.C. BURK
BY Hudson & Young
ATTORNEYS

Feb. 19, 1963  M. C. BURK  3,077,770
RUBBER BALE MOISTURE ANALYZER
Filed Feb. 15, 1960  5 Sheets-Sheet 4

INVENTOR.
M.C. BURK
BY Hudson & Young
ATTORNEYS

United States Patent Office 3,077,770
Patented Feb. 19, 1963

3,077,770
RUBBER BALE MOISTURE ANALYZER
Marvin C. Burk, Bartlesville, Okla., assignor to Phillips Petroleum Company, a corporation of Delaware
Filed Feb. 15, 1960, Ser. No. 8,590
6 Claims. (Cl. 73—73)

This invention relates to an improved apparatus for determining the moisture content of raw rubber. In another aspect, it relates to the use of a compact moisture-measuring device for baled rubber on the conveyer line in a producing plant. In a more specific aspect, it relates to the application of a thermal-conductivity, gas-analysis cell utilizing thermistors for the measurement of moisture content of solid rubber.

In the preparation of raw rubber for compounding and fabrication into rubber goods, the moisture content of baled rubber is an indicator of certain significant physical properties of the raw rubber, and thus a convenient method of quality control. It has been past practice to periodically take a sample from the rubber bales as they move down a conveyer line, and subject this sample to a laboratory analysis. If the moisture content of the sample bale is outside specifications, the entire lot of perhaps 40 to 50 bales must be rejected as off-specification. In this practice, the moisture content of a single bale, which may itself have been aberration, will determine the disposition of a large number of bales. It becomes apparent that some means of a more expeditious and less wasteful sampling and moisture determination would be a significant step forward in the art.

I have discovered that a thermal-conductivity, gas-analysis cell can be adapted by the device of my invention to the ready measurement, with acceptable accuracy, of the moisture of baled rubber. A Wheatstone-type bridge may be used to measure the changes in resistance of the thermistor sensing element. In the apparatus of this invention, sample and reference thermal-conductivity cells, and an air heater are conveniently mounted in a cylindrical holder, the holder being generally described as a sensing head. This sensing head is suspended over the conveyer line by means such that the top of the bale is able to roll under the head. Piston means, for driving the head downward against the bale, while the conveyer belt has been stopped for a prescribed interval to permit a measurement, are provided. The procedure of this invention is to draw a part of a dry, preheated air sample across a circular surface of the rubber bale enclosed by the sensing head, picking up moisture therefrom. The air then passes directly to the sample cell of the thermal-conductivity cell, while the balance of the heated air goes to the reference side of the same cell. The variation in electrical conductivity of the detector element, due to the altered heat-conducting property of the moistened air, is registered almost simultaneously on the bridge. The bridge is then automatically balanced and a recorder with the calibrated reading indicates the moisture content of the sampled bale.

An object of this invention is to permit a quick and reliable measurement in the plant of the moisture content of rubber bales.

Another object is to adapt a thermal-conductivity, gas-analysis cell and bridge circuit to the measurement of rubber bale moisture content in the plant.

A further object is to provide a construction of a moisture-detecting device having a sensing head adapted to confine a sample quantity of air drawn over the surface of the material, the moisture content of which is to be determined.

Further objects and advantages of this invention will become apparent to those skilled in the art from a study of the accompanying disclosure, drawings and appended claims.

Figure 1:
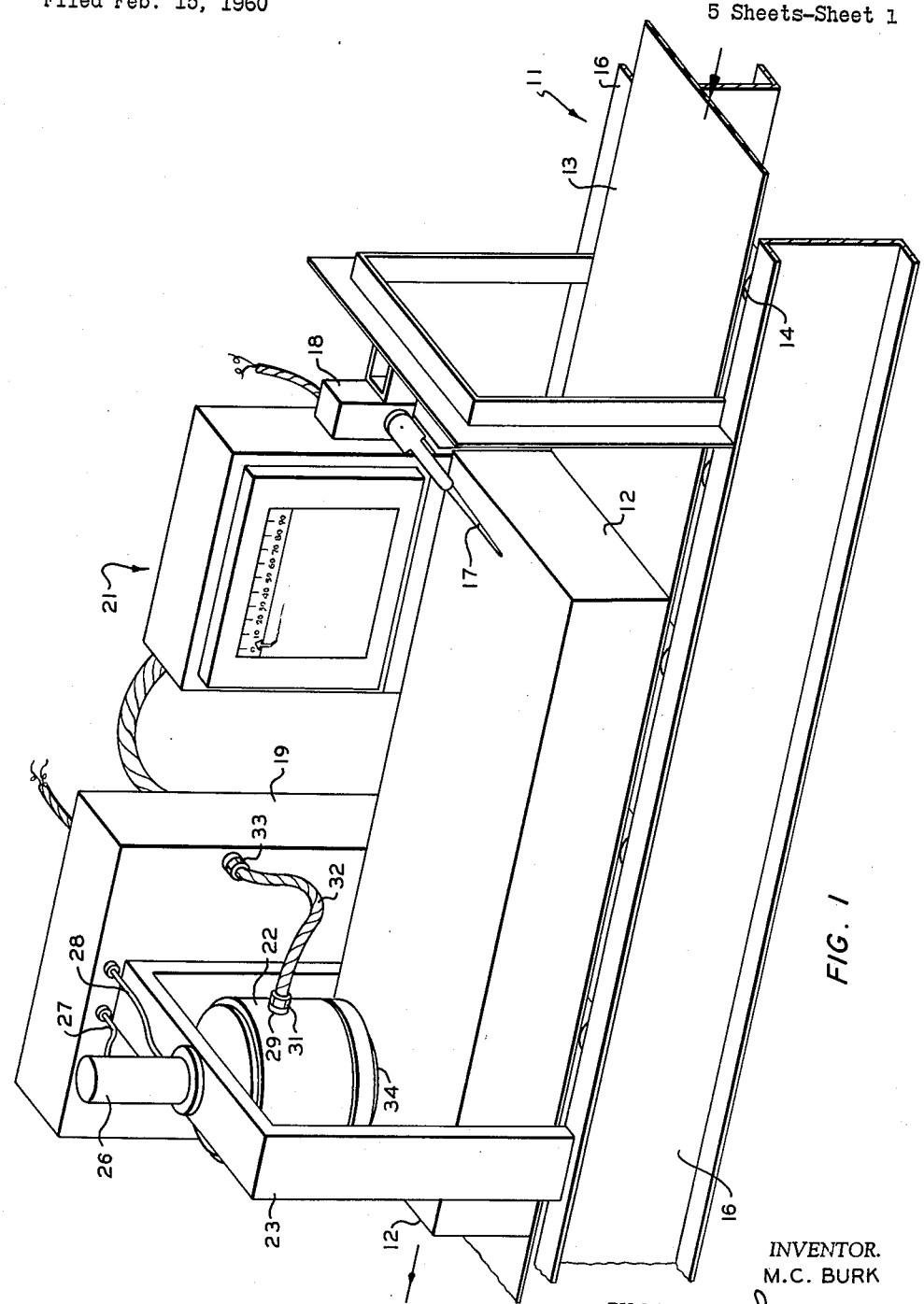
FIGURE 1 is a typical view of the arrangement of the sensing head cylinder, control panel, and recorder in relation to the rubber bales on the conveyer line.

Referring now to the drawings, wherein like parts have been designated with like reference numerals, and to FIGURE 1 in particular, showing a typical installation of the invention on a rubber bale conveying line, generally designated 11. A generally, block-shaped rubber bale 12 moves along on the top of conveyer belt 13, which is supported on motor-driven cylinders 14, rigged in conveyer belt frame 16. A lever 17 depends from a switch box 18, and when in its undisturbed position is designed to hang vertically and extend to within a short distance of conveyer belt 13. This distance from the belt being less than the height of a bale as it moves along on the conveyer belt. The leads (not shown) from switch box 18 run to a control unit 19, which contains most of the circuitry and timing control mechanism for operating the moisture-measuring device. Control unit 19 is electrically connected to a standard recorder 21, which is located in a convenient position for reading.

A distance farther along the conveyer belt, which distance is less than the length of a rubber bale, is located a sensing head 22, mounted on a support member 23, which member straddles and is secured to conveyer belt frame 16. The upper end of the sensing head is provided with an axially-connected cylinder 26, the piston of which can be pneumatically actuated to move the sensing head 22 down against a rubber bale 12. Cylinder 26 is provided with two air tubes, 27 and 28, which lead to control unit 19. Intermediate the ends of sensing head 22 is an outlet 29 provided with a threaded mounted lock nut 31 which locks to the sensing head a tube 32 that passes therefrom, said tube contains numerous electrical leads and air tubes (not shown), which are connected to control unit 19 at the other end 33 of tube 32. The lower end of sensing head 22 terminates in a face plate 34, adapted to seat tightly on the top surface of a rubber bale directly below it, when the sensing head is lowered by actuating means 26.

Control unit 19 is also provided with an intake from the plant air supply line (not shown), which air intake is split into two small-diameter air feed lines (not shown) that pass to sensing head 22 through tube 32. Each of these air lines is provided with a pressure regulator (not shown), such as one made by the Conoflow Company, and also restrictions in the lines. This arrangement provides a low-pressure, regulated air supply to the sensing head.

Figure 3:
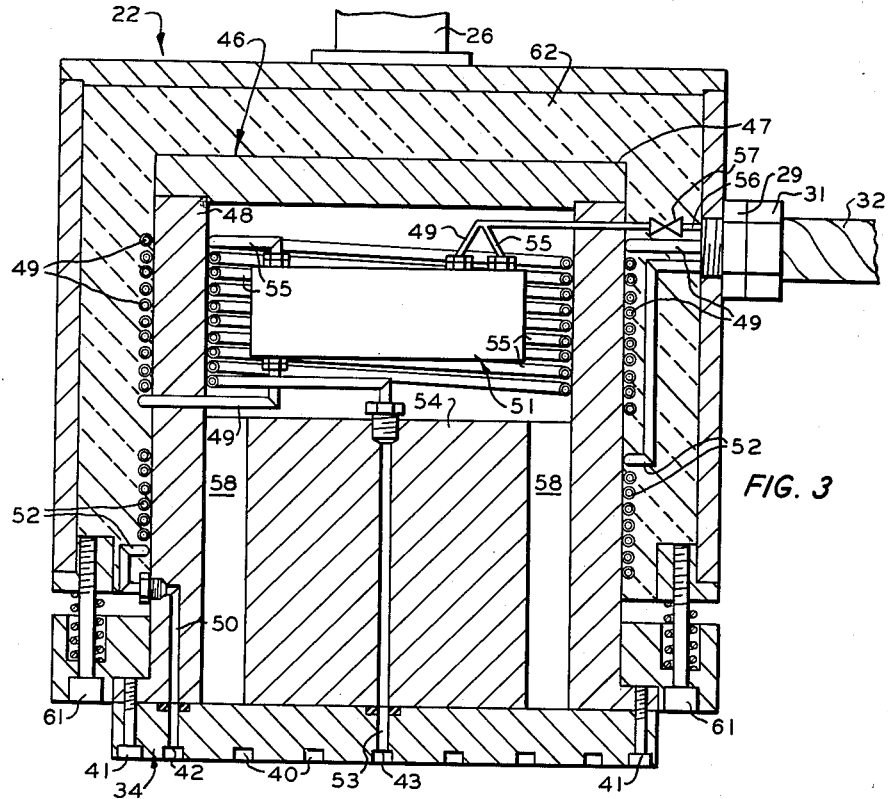
FIGURE 3 is a cross-sectional view of the elements contained in the sensing head component of this invention.
Figure 2:
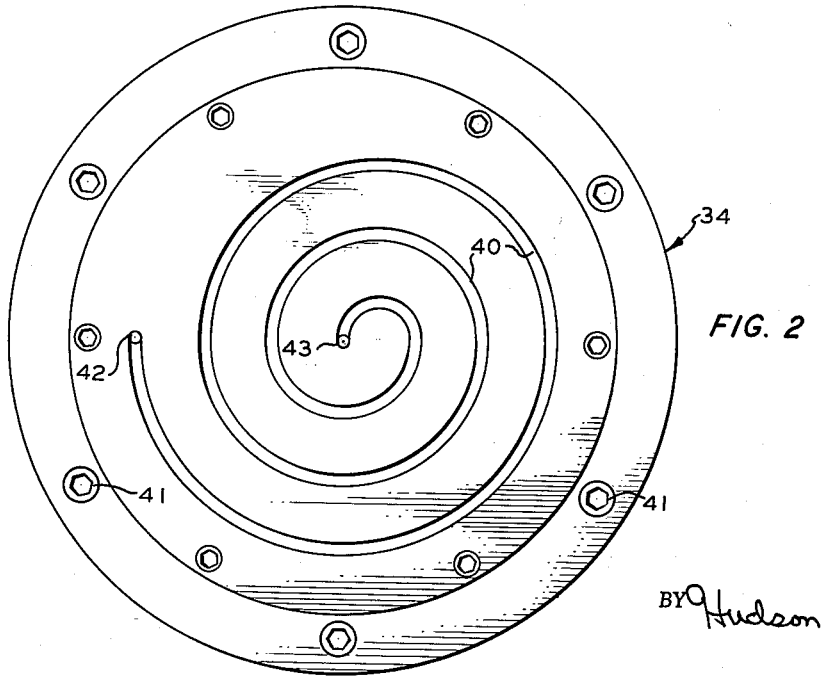
FIGURE 2 is a plan view looking at the bottom of the sensing head of FIGURE 1.

A bottom view of face plate 34 is shown in FIGURE 2. The appearance is that of a grooving or channel 40, which describes a spiral flow path from the outer area of the face plate toward the center thereof. A typical specification for the spiral would be three and a half turns with a lead of ⅜ of an inch. The cross-section of a groove would be ⅛ of an inch wide by 0.050 inch. The spiral area is bounded by a plurality of bolts 41, which secure the face plate to the body of the sensing head. It will be noted that the channels themselves are rectangular in cross-section (as seen in FIGURE 3), in order to prevent the rubber surface from bulging up into the channels and blocking the gas flow through the grooving. A small opening 42 is provided at the terminal of the outermost groove of the face plate, and a second small opening 43 also through the face plate, is provided at the center of the face plate, which is the inner terminal of the grooves.

In FIGURE 3, a cross-sectional view of hollow sensing head 22 is shown. Another, hollow inner cylinder, generally designated 46, and preferably of aluminum metal or the like, to facilitate heat conduction, is provided with a suitably secured top plate 47, circular sides 48, and bottom face plate 34, which is secured to the flanged lower end of cylinder 46 by bolts 41. Cylinder 46 is externally wound in the upper portion thereof with a small diameter air tubing 49, which enters the sensing head through tube 32. Tube 49 passes through wall 48 and enters the reference thermistor (not shown) of thermal-conductivity cell 51. A second air passage defined by a similar tubing 52, also enters head 22 within tube 32, which is wound externally for several turns around the lower part of sides 48, the tubing then goes through passage 50 within the wall 48 of cylinder 46, through face plate 34, and into the outer terminal 42 of grooving 40. At the inner terminal 43 of spiral grooving 40, a passage 53 is provided within center cylindrical support 54, back to the inner wall of cylinder 46, through more turns of internally wound tubing 55, and finally past the sample thermistor (not shown) within thermal-conductivity cell 51.

Downstream from the two thermistors, and outside cell 51, is provided a Y-connection, where the air tubes 49 and 55 join and pass out of cylinder 46 as single air vent line 56, then back through tube 32. Ventline 56 is also provided with a diaphragm valve 57. Peripherally-disposed about inner support 54 are six, equally-spaced, cartridge heaters 58, for heating and maintaining a desired temperature within cylinder 46. Heat conducted through the walls 48 thereof, preheats the gas passing in wound tubings 49, 52 and 55. A single temperature-sensing thermistor (not shown) is located on the same circle described by the six heaters, between any two of them, which is the detecting means for regulating current supply to the heaters. Necessary electrical leads (not shown) run from the thermal-conductivity cell, valve 57, the heaters, and the sensing themistor back to the control unit 19 of FIGURE 1 through tube 32. Cylinder 46 is suitably fastened within sensing head 22 by means of a number of spring-loaded bolts 61. The volume 62 between cylinder 46 and sensing head 22 is filled with a suitable insulating material, such as fiberglass.

In operation, the temperature of the sensing head is maintained at 160° F. Dry air enters through externally wound tubing 49, through the reference side of thermal-conductivity cell 51, valve 57, ventline 56, and back through tube 32 to be vented to the atmosphere. Dry air also flows through an externally wound tubing 52, passage 50, spiral grooving 40, passage 53, internally wound tubing 55, past the sample thermistor of cell 51, valve 57, through ventline 56 and is vented to the atmosphere after being returned to control unit 19 in tube 32. The two thermistors of the thermal-conductivity cell are electrically connected in bridge circuit of FIGURE 5, which responds to the difference in thermal-conductivity of the two air streams, one humidified, and the other not.

When the sensing head 22 is in the up position, the zero balance of the detector is corrected by closing diaphragm valve 57. This permits dry air entering through tubing 49 to pass through the reference side of cell 51, back through the sample side of the cell, through tubing 55, passage 53, and is finally vented to the atmosphere through face plate opening 43.

Figure 4:
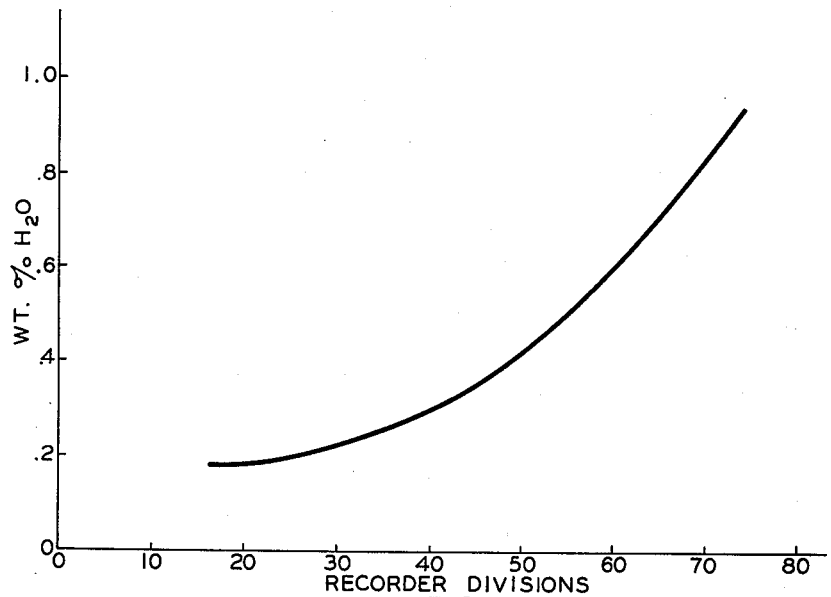
FIGURE 4 is a curve illustrating the relation between recorder readings and bale moisture content.

FIGURE 4 shows a sample plot of weight percent of moisture in rubber bale versus the reading in record divisions on recorder 21 of FIGURE 1. The correlation between recorder readings and moisture content was first determined in a laboratory, in which the actual moisture content of samples taken from the same bales measured on the analyzer, was determined by a heat loss test, and plotted against the corresponding recorder reading. Once this calibration has been satisfactorily established, and having a reading on the recorder, it can be quickly converted to the desired moisture content measurement by reference to the chart. When the moisture range of a run of bales changes, it is possible to make a new sensitivity setting for the analyzer to include the range of moisture content expected, and recalibrate.

Figure 5:
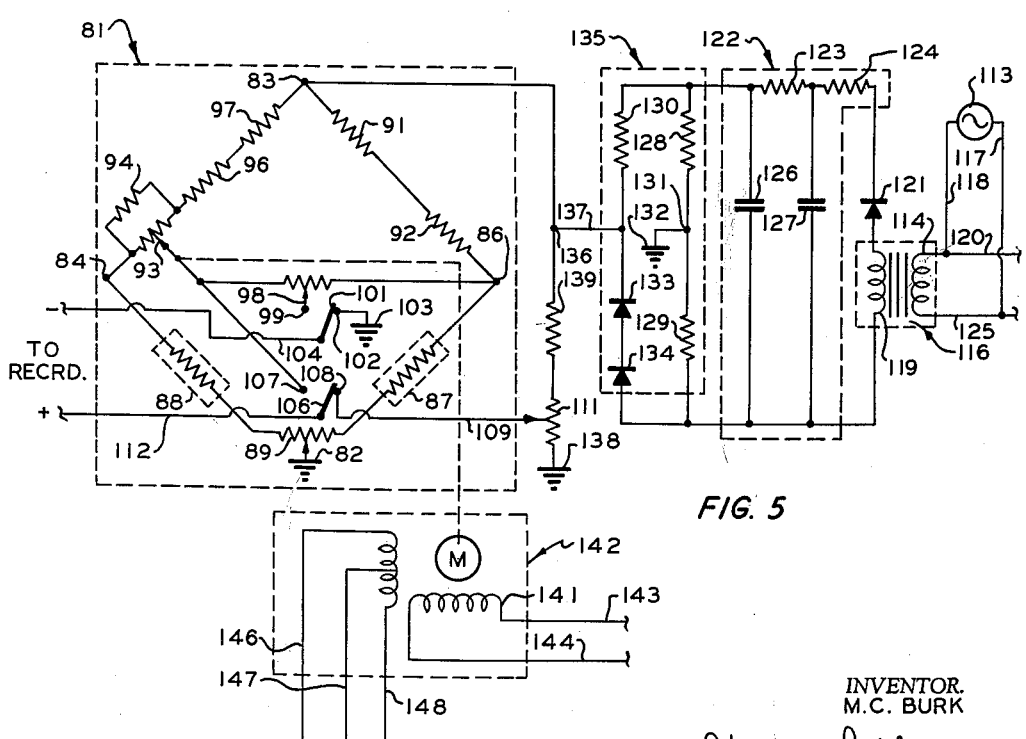
FIGURE 5 is a schematic view of the circuitry of the bridge.
Figure 8:
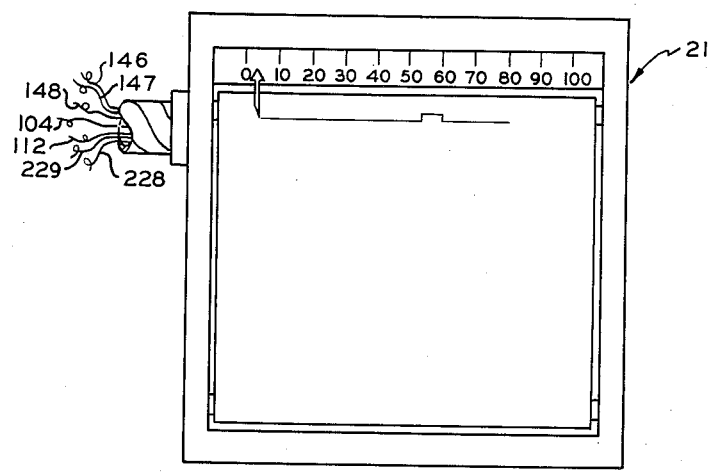
FIGURE 8 is a schematic view of the recorder.

In FIGURE 5 is shown the bridge circuit, generally designated 81, parts of which are mounted in the sensing head 22 and the remainder in control unit 19, both of FIGURE 1. The fragile parts of the bridge are in the control unit and are connected to the nonfragile parts in the sensing head by electrical leads running through tube 32, also shown in FIGURE 1. The four corners of the bridge are terminals 82, 83, 84 and 86. The reference side of thermal conductivity cell 51 of FIGURE 3, a thermistor, is shown in 87, while the sampling element, another thermistor, is shown at 88, with the coarse zero adjuster shown as potentiometer 89, which is between the two thermistor elements. The coarse zero adjuster is connected to ground 82 and is the contactor of potentiometer 89. The arm of the bridge between points 83 and 86 consists of resistors 91 and 92, having 700 and 800 ohms resistance, respectively. The adjacent arm of the bridge, between terminals 83 and 84, consists of automatic zero adjustment potentiometer 93, shunted by resistor 94, in series with resistors 96 and 97, having 800 and 700 ohms, respectively. A sensitivity adjustment potentiometer 98 is connected between point 86 and the contactor of automatic zero adjustment potentiometer 93. The contactor on potentiometer 98 is connected through contact 99 to switch 101. Contact 102 of switch 101 is connected to ground at 103. The contactor of switch 101 is connected by lead 104 to the recorder (as shown in FIGURE 8). The contactor of potentiometer 93 is also connected to switch 106 by means of contact 107 thereof. Contact 108 of switch 106 is connected through lead 109 to calibrating potentiometer 111. In operation, potentiometer 111 supplies a bias voltage to be applied to the recorder for calibrating purposes, when no signal on the bridge is being applied. The contactor of switch 106 is connected by means of lead 112 to the positive terminal of the recorder (as shown in FIGURE 8). Switches 101 and 106 are in ganged arrangement, and in the position shown, are connected by leads 104 and 112 for calibration of the recorder. When switches 101 and 106 are connected in the opposite positions to that shown in FIGURE 5, the output from the bridge circuit is being applied to the recorder.

D.C. power is being applied to the bridge between terminal 83 and ground 82 by means of source 113. 110 volts A.C. current from source 113 is applied to the primary winding 114 of transformer, generally designated 116, through leads 117 and 118. The secondary winding 119 of transformer 116 is connected through a rectifier 121 and a filter, generally designated 122, which is made up of resistors 123 and 124, of 215 and 500 ohms, respectively, and capacitances 126 and 127 connected to the opposite terminals of winding 119. Three resistors 128, 129 and 130, having 2000, 20 and 200 ohms, respectively, and a contact 131 between 128 and 129, connected to ground at 132, together with Zener diodes 133 and 134, form a bridge, generally designated 135. This bridge serves to compensate for changes in line voltage from power source 113. Power is supplied to bridge 81 from source 113, through transformer 116, filter 122, bridge 135, contact 136, lead 137, to terminal 83. Lead 137 is also connected to ground at 138 through contact 136, series resistance 139, and calibrating potentiometer 111, so as to supply a calibrating voltage to the recorder. Coil winding 141 of an automatic, shaded coil, zero motor, generally designated 142, receives A.C. power through leads 143 and 144, which comes from source 113, through a programmer (shown in FIGURE 6). Leads 146, 147, and 148 from zero motor 142, connect with the recorder pen (also shown in FIGURE 8).

Figure 6:
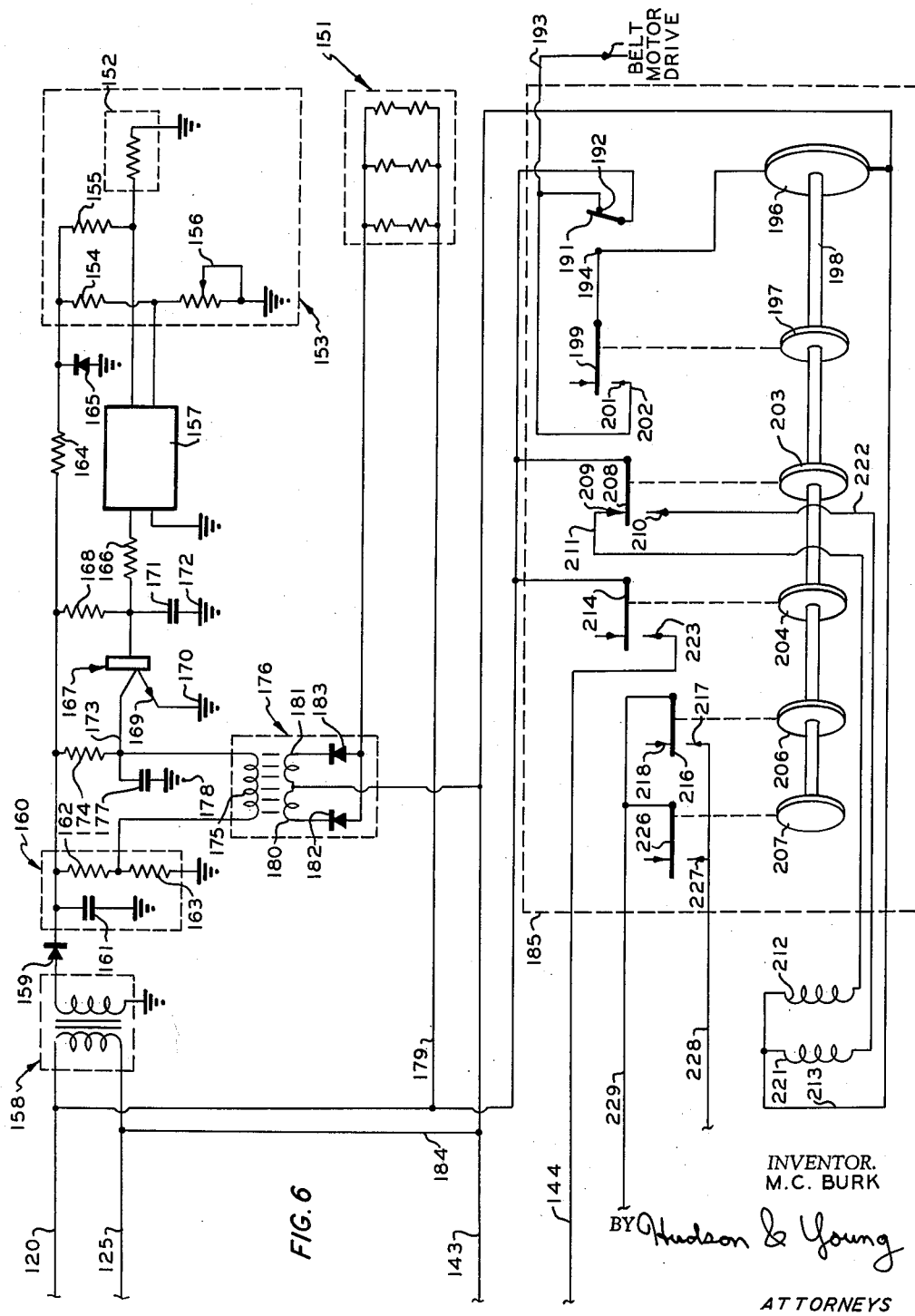
FIGURE 6 is a schematic view of the circuitry of the control unit and automatic temperature regulating component for the sensing head.

FIGURE 6 shows schematically the six heating cartridges, generally designated 151, which are used to heat the sensing head shown in FIGURE 3, as well as a temperature-sensing detector 152, which is the detecting means for regulating the supply of current to heater 151, in order to maintain the sensing head at a fixed temperature. Temperature-sensing thermistor 152 forms one arm of a bridge circuit, generally designated 153, which circuit is composed of resistors 154 and 155, and a rheostat 156 which adjusts the temperature at which detector 152 responds. The output signal from heat sensing detector 152 is applied to amplifier 157. A potential is applied to bridge 153 by means of rectified and regulated voltage obtained from a transformer, generally designated 158, via rectifier 159, and a filter, generally designated 160, which filter is made up of grounded capacitance 161 and resistors 162 and 163, through resistor 164 and grounded Zener diode 165. The amplified signal from amplifier 157 is applied through resistor 166 to the base of a transistor generally designated 167. Biasing potential is also applied to the base of transistor 167, by way of resistance 168, which is connected to the power supply via 158, 159 and 160. The emitter 169 of transistor 167 is connected to ground at 170, as is the base of the transistor by a condenser 171 to ground at 172. Biasing current is supplied to collector 173 through resistance 174. Transistor 167 thus regulates the saturating current in the winding 175 of a saturable reactor, generally designated 176. The current through winding 175 is obtained through a grounded voltage divider composed of resistors 162 and 163, and flows via collector 173, the base of transistor 167, emitter 169 to ground at 170. A filtering condenser 177, connected to ground at 178 is located between the transistor side of winding 175 and collector 173 of transistor 167. Power to heaters 151 is obtained from the A.C. (source shown at 113 of FIGURE 5) through primary lead 120, lead 179, saturable reactor coils 180 and 181, rectifiers 182 and 183, and lead 184, which is connected back to the other primary lead 125.

In operation, as the signal from temperature detector 152 varies, the saturating current through winding 175 of saturable reactor 176 also varies, which saturating current regulates the magnetic coupling of reactor 176 and the amount of current flowing in coils 180 and 181, that is rectified to D.C. voltage by means of rectifiers 182 and 183.

In the lower portion of FIGURE 6 is the programmer section, generally designated 185, for operating the sensing head, the chart drive, the automatic zero adjusting motor and the belt drive. Switch 191 is a bale-operated switch, corresponding to the lever 17 and switch box 18 of FIGURE 1. Switch 191, in the position shown in FIGURE 6, has its contactor on contact 192. Electrical current is thus supplied by means of lead 193 to the motor drive (not shown) of conveyor belt 13 of FIGURE 1. When a rubber bale makes contact with the lever arm of switch 191, the contactor of switch 191 is moved over to contact 194, shutting off the current to the belt motor drive, and alternately applying current to timer motor 196. Timer motor 196 is made to operate for 60 seconds, and near the end of the 60-second period, cam 197 on cam shaft 198 of motor 196, moves the contactor of switch 199 against contact 201, thereby supplying current again to start the belt motor drive. It will thus be apparent that after the bale has moved on past the sensing head, spring-loaded switch 191 will automatically move back to contact 192, as lever 17 of FIGURE 1 falls back to vertical position, thus permitting the belt drive to bring into position a new bale of rubber which again strikes lever 17 and trips switch 191 to stop the belt. Cam 197 does not operate switch 199 again until the end of another 60-second period. In this interval, cams 203, 204, 206 and 207 operate switches on components of the analyzer which control various steps in the moisture analysis cycle that are now to be described.

Figure 7:
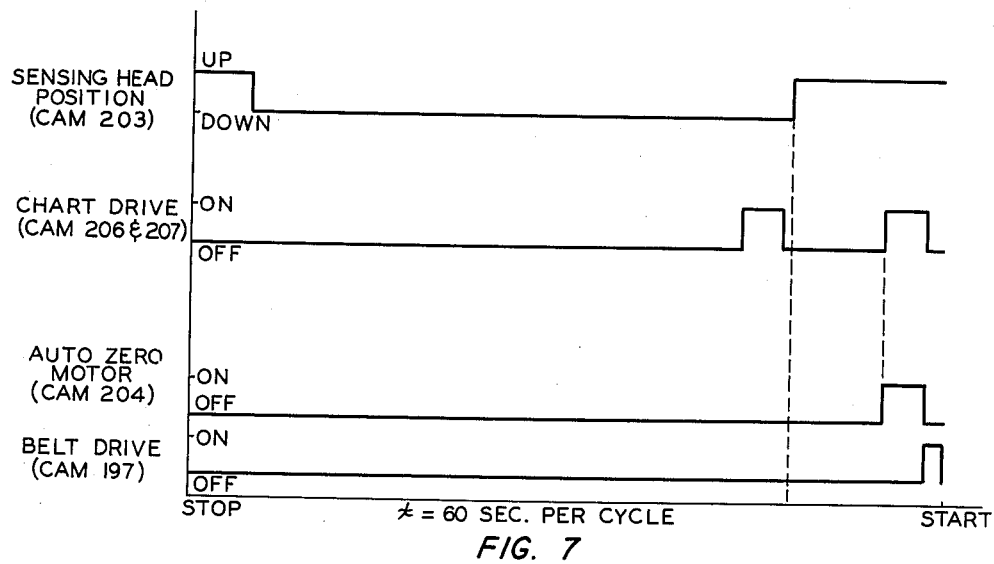
FIGURE 7 is a graph indicating the relation of sensing head position, chart drive, and automatic zero motor, as functions of the program between bale stop and restart.

When switch 191 is tripped over to contact 194 by the front of bale, shutting off the current to the belt driving motor, the inertia of the belt, and the bales thereon, permits a bale to move under the sensing head. Cam 203 operates switch 208 within a few seconds of the start of the cycle (as shown in FIGURE 7) to apply current through contact 209, lead 211, solenoid 212 and lead 213, to move the sensing head down onto the bale of rubber. Solenoid 212 operates an air valve (not shown) which sends air through air tube 28 to drive cylinder 26 downward shown in FIGURE 1. The sensing head remains in the down position during most of the 60-second period, and heated air is continually drawn through the sensing head grooving and over the enclosed surface of the rubber bale. Cam 204, which is also driven by timer motor shaft 198, maintains switch 214 in the up position until it is time for the zero measurement to be described below. Cams 206 and 207 operate on the same circuit, but are shown as two cams, rather than one, for purposes of simplicity.

During a large part of the 60-second operation, air has been circulating, but the recorder chart drive has not moved (as shown in FIGURE 7). After about 45 seconds, cam 206 operates switch 216 to close the circuit of the chart drive motor via a contact 217, during which several-second interval, a reading is recorded on the chart, after which, cam 206 moves the contactor on switch 216 back again to contact 218. After this measurement has been recorded, cam 203, mentioned above, moves the contactor of switch 208 from contact 209 back to contact 210, causing the sensing head to be raised from the bale of rubber, and current to be supplied to zero solenoid 221 through leads 222 and 213. The operation of solenoid 221 closes the diaphragm valve 57 on the vent line 56 of sensing head (shown in FIGURE 3), thus causing the same air sample to be continuously passed through the reference and sample thermistors of the sensing head. After air has circulated through the sensing head for a while, cam 204 operates switch 214 to move the contactor to contact 223, passing current through lead 144 to coil 141 of automatic zero motor 142, back through lead 143, lead 184 and lead 125.

FIGURE 7 shows the sequence of operation, during the 60-second measurement cycle, for the sensing head, chart drive, automatic zero motor, and belt drive. It will be readily noted in FIGURE 7, that the chart motor is again driven during the time the zero adjustment is being made. The chart motor circuit is closed by means of cam 207 operating switch 226 to connect with contact 227, thus passing current through leads 228 and 229 to the chart motor drive for several seconds. It is thus seen that a zeroing of the bridge 81 of FIGURE 5 is made, when the same gas, such as air, is flowing through both the sample and reference thermistors of cell 51 of FIGURE 3. It will also be noted in FIGURE 7 that the operation of cam 197 starts the conveyor belt motor again, only after a measurement of moisture has been made and the zeroing of the instrument has occurred.

FIGURE 8 is an elevational view of the recorder. Leads 146, 147 and 148 are from automatic zero motor 142 of FIGURE 5. Leads 104 and 112 are from the bridge circuit 81 of FIGURE 5. Leads 228 and 229 are from the programmer section 185 of FIGURE 6.

Referring again to FIGURE 5, the zeroing of the bridge, when current is supplied to coil 141 of motor 142, occurs when the recorder is not on zero.

When the recorder is on zero, a single-pole, double-throw switch mounted in the recorder (not shown) will be maintained in center position, and no signal will be permitted to operate the automatic zero motor 142. If the recorder is not on zero, one side of the switch will be closed, causing leads 147 and 148 to be shorted, or 146 and 147, resulting in the zero motor operating in one direction, or the other. In this manner, the resistance of the bridge is balanced when the gas, passing through both the reference and the sample elements, is the same.

Various modifications of the invention will become apparent to those skilled in the art and the illustrative details disclosed are not to be construed as imposing unnecessary limitations on the invention.

I claim:

1. A moisture-sensing head comprising, in combination: a face plate closing one end of said head; a hollow metal cylinder centrally disposed within said head; a thermal conductivity cell disposed within said cylinder; heating means adjacent said cylinder for maintaining said sensing head at a prescribed temperature; first and second inlet means in the side of said head adapted to receive a stream of dry air; first conduit means communicating between said first inlet means and a reference thermistor within said cell; an elongated spiral flow path between two spaced points in said face plate of said sensing head for conducting air over a moisture-containing surface sealed thereby; a first opening at one of said points; a second opening at the other of said points; second conduit means communicating between said second inlet means and said first opening; third conduit means communicating between said second opening and a sampling thermistor within said cell; fourth conduit means to vent the air from said cell; and means connected to said thermistors to transmit their respective output signals to automatic balancing and recording means.

2. The apparatus of claim 1 wherein said first and second conduit means are wound about the outer wall of said cylinder, and said third conduit means is wound about the inner wall of said cylinder adjacent said heating means.

3. In a conveyor line for transporting rubber bales, a moisture analyzer, comprising, in combination: a rigid frame supported above said line; a sensing head operatively supported on said frame and spaced from the top surface of the moving bales; means operatively secured to said head for driving the latter downwardly to make sealing contact with one of said rubber bales; a thermal conductivity cell disposed within said sensing head; first and second conduit means for passing dry air from a source of the same to said sensing head; a face plate secured to and forming the lower end of said sensing head; an elongated flow path between two spaced points in said face plate for conducting air over the sealed area of said bale; a first opening at one of said points; a second opening at the other of said points; said first conduit means passing within said sensing head and communicating with a reference thermistor within said thermal conductivity cell; said second conduit means also passing within said head and communicating with said first opening; third conduit means communicating between said second opening and a sampling thermistor within said cell; fourth conduit means to vent the air from said cell; means to compare the impedances of said thermistors and to establish a signal representative of the difference between the said impedances; switch means for actuating said means for driving and for controlling the movement of said line; and lever means pivotally connected to said switch means and located with respect to said line whereby the same is moving when the lever is in the undisturbed position, and said line is stopped when said lever is deflected by a rubber bale passing thereunder.

4. In a conveyor line for transporting rubber bales, a moisture analyzer, comprising, in combination: a rigid frame supported above said line; a sensing head operatively supported on said frame and spaced from the top surface of the moving bales; means operatively secured to said head for driving the latter downwardly to make sealing contact with one of said rubber bales; a thermal conductivity cell disposed within said sensing head; first and second conduit means for passing dry air from a source of the same to said sensing head; a face plate secured to and forming the lower end of said sensing head; a grooving describing a spiral flow path from near the perimeter of said face plate to the center thereof for conducting air over the sealed area of said bale; a first opening at the outer terminal of said grooving; a second opening at the inner terminal of said grooving; said first conduit means passing within said sensing head and communicating with a reference thermistor within said cell; said second conduit means also passing within said head and communicating with said outer terminal; third conduit means communicating between said inner terminal and a sampling thermistor within said cell; fourth conduit means to vent the air from said cell; means to compare the impedances of said thermistors and to establish a signal representative of the difference between the said impedances; switch means for actuating said means for driving and for controlling the movement of said line; and lever means pivotally connected to said switch means and located with respect to said line, whereby the same is moving when the lever is in the undisturbed position and said line is stopped when said lever is deflected by a rubber bale passing thereunder.

5. The apparatus of claim 4 further comprising heating means for maintaining said sensing head at a prescribed temperature responsive to a temperature sensing means.

6. The apparatus of claim 4 wherein said sensing head further comprises: a centrally spaced hollow metal cylinder disposed within said head and closed at its lower end by said face plate; a plurality of heating cartridges spacedly disposed in the annular space defined by inner wall of said head and the outer wall of said cylinder; the portions of said second and third conduit means within said head being wound about the outer wall of said cylinder; and said fourth conduit means being wound about said inner wall adjacent said cartridges.

References Cited in the file of this patent

UNITED STATES PATENTS

| | | |
|---|---|---|
| 1,694,349 | Witham | Dec. 4, 1928 |
| 1,741,266 | Witham | Dec. 31, 1929 |
| 2,637,199 | Allander | May 5, 1953 |